(12) United States Patent
Popescu-Stanesti et al.

(10) Patent No.: US 7,627,724 B2
(45) Date of Patent: Dec. 1, 2009

(54) PERSISTENT, REAL-TIME DETERMINATION OF THE FRESHNESS OF CHANGEABLE DATA ASSOCIATED WITH A CONTAINER

(75) Inventors: Mihai Popescu-Stanesti, Sammamish, WA (US); Shajan Dasan, Sammamish, WA (US); Menton J Frable, Bothell, WA (US); Stefan I Larimore, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 257 days.

(21) Appl. No.: 10/872,744

(22) Filed: Jun. 21, 2004

(65) Prior Publication Data

US 2005/0283567 A1  Dec. 22, 2005

(51) Int. Cl.
*G06F 12/00* (2006.01)
(52) U.S. Cl. .................................... 711/156
(58) Field of Classification Search ................. 711/156
See application file for complete search history.

(56) References Cited

U.S. PATENT DOCUMENTS

| | | | |
|---|---|---|---|
| 5,685,003 A | | 11/1997 | Peltonen et al. |
| 6,438,706 B1 * | | 8/2002 | Brown ........................... 714/7 |
| 6,460,054 B1 * | | 10/2002 | Grummon .................... 707/204 |
| 6,535,994 B1 * | | 3/2003 | Kedem ........................... 714/6 |
| 6,848,035 B2 * | | 1/2005 | Akiyama et al. ............ 711/156 |
| 2003/0179742 A1 * | | 9/2003 | Ogier et al. .................. 370/351 |
| 2004/0041696 A1 * | | 3/2004 | Hull et al. ................. 340/10.42 |
| 2005/0108189 A1 | | 5/2005 | Samsonov |

OTHER PUBLICATIONS

Hash Tables; http://www.functionx.com/bcb/classes/thashtable.htm; Apr. 5, 2004, FunctionX, Inc.*

* cited by examiner

*Primary Examiner*—Reginald G Bragdon
*Assistant Examiner*—Aracelis Ruiz
(74) *Attorney, Agent, or Firm*—Merchant & Gould

(57) ABSTRACT

The invention efficiently determines whether a container that is associated with an item of changeable data actually is associated with the freshest version of this item of changeable data. Multiple containers may exist in the virtual memory ("in-memory container") or in a persistent storage system ("persistent container") of a computer system and be associated with different versions of an item of changeable data. A table in the virtual memory reveals the freshness of changeable data associated with in-memory containers. One or more in-memory containers associated with one or more same items of changeable data are merged into a new persistent container and removed from the virtual memory. A persistent container is associated with a list that identifies all changeable data associated with the persistent container. An invalidation process invalidates, in the lists associated with older persistent containers, older versions of the changeable data associated with the new persistent container.

19 Claims, 14 Drawing Sheets

Fig.5A.

216 IN-MEMORY INDEXES

512 IN-MEMORY INDEX A

| KEY WORD | DOC_ID |
|---|---|
| ABC | F1, F3 |
| DEF | F4 |

514

512N IN-MEMORY INDEX N

| KEY WORD | DOC_ID |
|---|---|
| ABC | F4 |
| XYZ | F4 |

Fig.5B.

218 516 IN MEMORY FRESH TEST TABLE

| DOC_ID | INDEX_ID | TIME STAMP |
|---|---|---|
| F1 | A | 1 |
| F3 | A | 1 |
| F4 | A | 1 |
| F4 | N | 14 |
| ... | ... | ... |

220 524 DEPENDENCY TABLE

| NEW INDEX_ID | OLD INDEX_ID |
|---|---|
| N | A |
| ... | ... |

526

PERSISTENT, REAL-TIME DETERMINATION OF THE FRESHNESS OF CHANGEABLE DATA ASSOCIATED WITH A CONTAINER

FIELD OF THE INVENTION

The present invention relates generally to computer systems and methods, and more particularly to an improved system and method for efficiently determining the freshness of changeable data associated with a container.

BACKGROUND OF THE INVENTION

Contemporary computer applications, such as Microsoft SQL server, create an index of the content of documents in order to allow fast resolution of various types of queries about the indexed content. Due to ever-changing and increasing information, the content of a document may be updated several times during the document's life span, resulting in multiple indexes each referring to a different version of the same document.

Many current content indexing applications store indexing information in memory-mapped files. A memory-mapped file maps all or part of a file on disk to a specific range of addresses in the virtual memory of a computer system. FIG. 1 illustrates a memory-mapped indexing array 100. A memory-mapped indexing array, which is stored in continuous virtual memory, correlates each indexed document with a result index by associating each document identifier ("Doc_ID") 102 with a corresponding index identifier ("Index_ID") 104. For example, the memory-mapped indexing array 100 illustrated in FIG. 1 associates the document represented by Doc_ID F1 with the index represented by Index_ID 1, the document represented by Doc_ID F2 with the index represented by Index_ID 4, and the document represented by Doc_ID F3 with the index represented by Index_ID 6.

A 32-bit computer system may have up to four gigabytes of virtual memory space. Usually, the virtual memory space is highly fragmented; hence, it is hard to find a large block of continuous virtual memory space. Meanwhile, due to the explosion of information and the fast development of computer technology, a computer application, such as the next version of Microsoft SQL server, can easily index two hundred million documents, scalable to two billion documents. Using a memory-mapped indexing array 100 such as the one illustrated in FIG. 1 to store indexing data for such a large number of documents requires too large a memory space for the virtual memory of most contemporary 32-bit computer systems to accommodate. For example, assuming each Doc_ID 102 takes four bytes of virtual memory, and each Index_ID 104 takes another four bytes of virtual memory, then each pair of Doc_ID and Index_ID needs eight bytes of virtual memory. One million such pairs require eight megabytes of continuous virtual memory space to host the memory-mapped indexing array. Eight-megabytes of continuous virtual memory space is sometimes difficult for a normal 32-bit computing system to provide due to inherent memory address space fragmentation. Even more, an indexing array for two billion documents requires about sixteen gigabytes of continuous virtual memory space, which is usually beyond what current 32-bit computing systems can provide.

Another way to work with such a large memory-mapped array is to implement it as a file and operate it with a small number of memory-mapped sections. The oldest memory-mapped section would be unmapped when a new section is needed. This is exactly the way the virtual memory is extended in modern operating systems to a pagefile. But this technique would prove to be very inefficient if the pattern of accessing the memory-mapped array were in a totally random order, which means that constant mapping and remapping of different sections of the array is then necessary.

Therefore, there is a need for a method of content indexing that can store indexing information in patches of virtual memory space, instead of requiring a block of continuous virtual memory. Further, there is a need for a method of content indexing that efficiently determines whether an index references the freshest version of a document, when there are one or more indexes, each of which references a different version of the document. More broadly stated, there is a need for a method of indicating the freshness of changeable data, such as a document, associated with a container, such as an index. A container is associated with an item of changeable data by either containing or referencing this item of changeable data. There is also a need for a method of determining whether a container is associated with the latest or freshest version of changeable data. The present invention is directed to addressing these needs.

SUMMARY OF THE INVENTION

The present invention addresses the above-identified needs by providing a method, a computer-readable medium containing computer-executable instructions, and a computer system for indicating the freshness of changeable data associated with a container. The present invention also provides a method and a computer-readable medium containing computer-executable instructions for determining whether a container that is associated with an item of changeable data is associated with the freshest version of this item of changeable data.

In accordance with one aspect of the present invention, in a computer system comprising a volatile memory and a persistent storage medium, a method is provided to indicate the freshness of changeable data associated with a container. More specifically, a computer system may include multiple containers, each of which is associated with a different version of the same changeable data. In accordance with this aspect of the invention, a fresh test table stored in memory ("in-memory fresh test table") is updated when a new container appears in memory ("in-memory container"). The method adds to the in-memory fresh test table entries identifying each item of changeable data associated with the new in-memory container, along with information identifying the new in-memory container and when the new in-memory container is created. By doing so, the method enables the in-memory fresh test table to indicate the freshness of changeable data associated with an in-memory container.

In accordance with other aspects of this invention, a container in the persistent storage medium ("persistent container") is associated with a list that identifies all changeable data associated with the persistent container. The list can be any data structure that contains enumerated items. Upon the creation of a new persistent container, the method iterates through the lists associated with older persistent containers in search of older versions of the changeable data associated with the new persistent container. When found, the method marks these older versions of the changeable pieces of information as invalid.

In accordance with another aspect of this invention, in-memory containers associated with the same item of changeable data are correlated. For example, upon the creation of a new in-memory container, entries that identify the new in-memory container and all the older in-memory containers that are associated with one or more same items of changeable data are added to the dependency table. The correlation information contained in the dependency table is used to create a new persistent container by merging multiple in-memory containers associated with the one or more same items of changeable data. The multiple in-memory containers that have been merged into the new persistent container and their related entries in the in-memory fresh test table and the dependency table are then erased from virtual memory.

In accordance with yet another aspect of the present invention, a method and a computer-readable medium containing computer-executable instructions are provided for determining if a container that is associated with a certain item of changeable data is actually associated with the freshest version of this item of changeable data. A snapshot is made of all existing containers, whether they are in-memory containers or persistent containers. No container can disappear while there is a snapshot that contains this container. For each container in the snapshot that is associated with a certain item of changeable data, a freshness test is performed to determine if the container is associated with the freshest version of this certain item of changeable data.

In accordance with a further aspect of the present invention, a computer-readable medium that contains data structures for storing information for the above-mentioned methods is provided. The data structures include a fresh test table comprising entries identifying each item of changeable data associated with an in-memory container, the in-memory container, and when the in-memory container was created. The fresh test table can be implemented as a hash table. A dependency table that contains entries correlating in-memory containers associated with one or more same items of changeable data is also provided. The present invention also associates a container with a list identifying all items of the changeable data associated with the container.

In summary, the present invention provides a method, a computer-readable medium, and a system that indicate the freshness of changeable data associated with a container, which can exist in virtual memory or in persistent storage medium. Further, the present invention provides a computer-readable medium and a method for determining whether a container that is associated with a certain item of changeable data is actually associated with the freshest version of this certain item of changeable data. The present invention enables efficient use of computer virtual memory by allowing indexing information to be stored in patches of computer virtual memory through the use of data structures such as hash tables. In addition, by providing information indicating the freshness of changeable data such as a document associated with a container, the present invention drastically improves the speed of response to a query.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 5A-5C are diagrams illustrating exemplary embodiments of an in-memory index, an in-memory fresh test table, and a dependency table;

DETAILED DESCRIPTION OF THE PREFERRED EMBODIMENT

Figure 1:
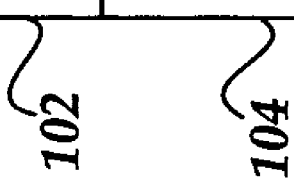
FIG. 1 is a diagram illustrating a conventional way of tracking indexing information that requires a block of continuous computer virtual memory.

The present invention generally provides a system, a method, and computer-readable medium for indicating the freshness of changeable data associated with a container. The present invention also provides a method and computer-readable medium for determining whether a container that is associated with a certain item of changeable data is actually associated with the freshest version of this certain item of changeable data. The container may be stored in virtual memory or in persistent storage medium.

While the present invention will be described in the setting of content indexing, where the containers are indexes and the changeable data are documents, those skilled in the relevant art and others will appreciate that the present invention may also find use in other settings that involve multiple containers associated with different versions of changeable data. Further, the illustrative examples provided herein are not intended to be exhaustive or to limit the invention to the precise forms disclosed. Similarly, any steps described herein may be interchangeable with other steps, or several combinations of steps, in order to achieve the same result. Accordingly, the described embodiments of the present invention should be construed as illustrative in nature and not as limiting.

In one preferred embodiment, the present invention provides a system, a computer-readable medium, and a method for indexing that employ various data structures to indicate the freshness of documents referenced in an index. The data structures include in-memory indexes, an in-memory fresh test table, and a dependency table, all of which reside in a real time storage system such as computer virtual memory. The data structures further include persistent indexes and their associated widsets, all of which reside in persistent storage medium, such as a hard disk. A widset is a list identifying the documents referenced by the persistent index.

In one embodiment of the present invention, an indexing system is provided. Upon receiving a request to index one or more documents, the indexing system processes one or more documents through a standard data acquisition process. The indexing system then stores the resultant document data in in-memory indexes. The indexing system also updates the in-memory fresh test table that keeps track of when an in-memory index is created and what documents it references. Periodically, the indexing system merges multiple in-memory indexes referencing one or more same documents into a new persistent index that exists in the persistent storage medium. The indexing system also erases all relevant information about these multiple in-memory indexes from the virtual memory as soon as they are merged into a persistent index. The indexing system then initiates an invalidation process that invalidates, in the widsets associated with older persistent indexes, older versions of the documents referenced by the new persistent index. The indexing system then changes the status of the widset associated with the new persistent index from dirty to clean, indicating that the widset has gone through the invalidation process successfully.

The present invention also provides a method for determining whether an index referencing a certain document references the freshest version of this document. First, a snapshot of all the existing indexes, including in-memory indexes and persistent indexes, is made. The snapshot also ensures that none of these indexes will disappear while there is a snapshot that contains it. For each index in the snapshot that references a certain document, a freshness test is performed to determine if the index references the freshest version of the document.

Figure 2:
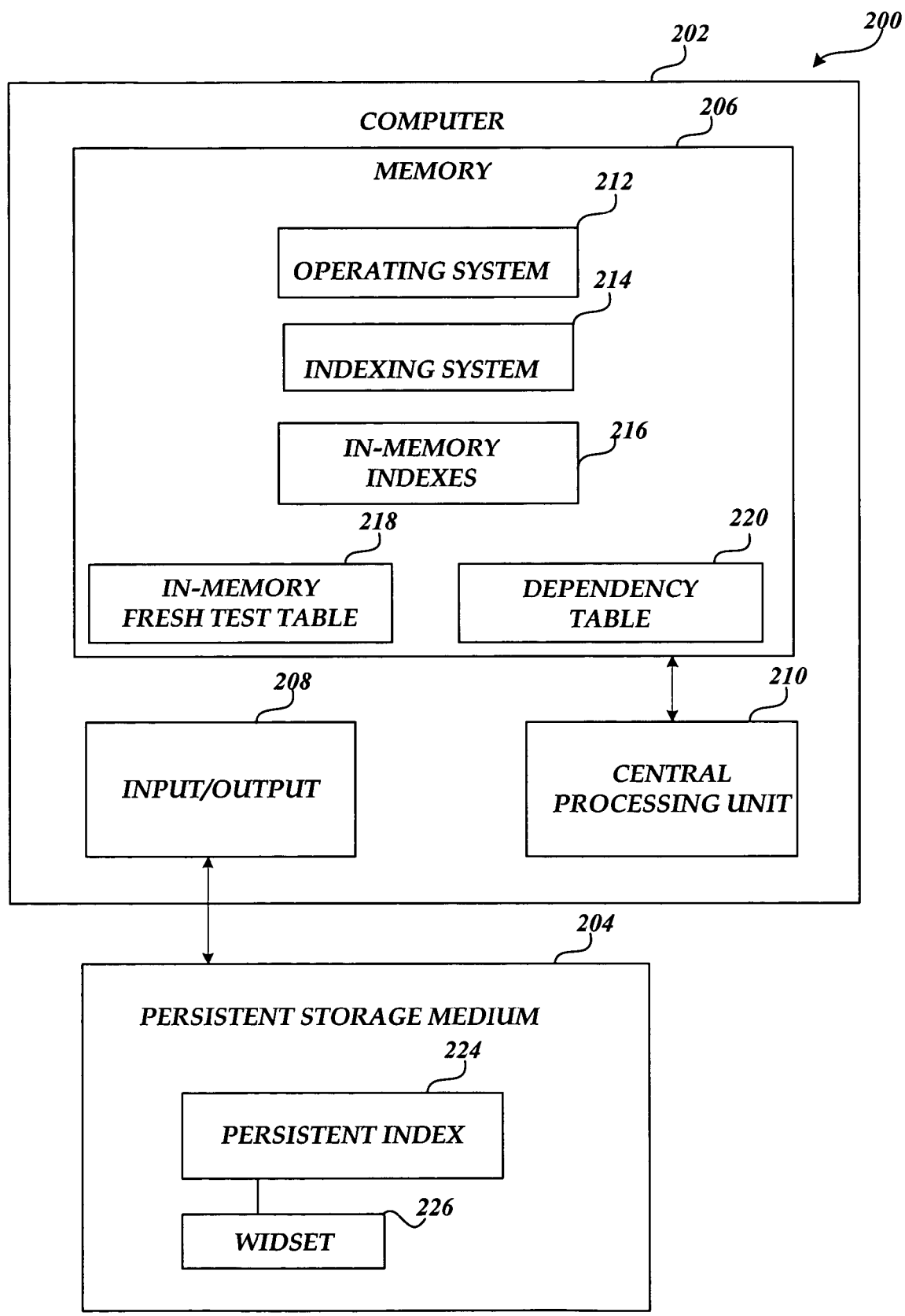
FIG. 2 is a block diagram illustrating an exemplary embodiment of the present invention.

FIG. 2 illustrates the main components of a computer system 200 suitable for implementing an embodiment of the present invention. The computer system 200 comprises a computer unit 202 and a persistent storage medium 204. The computer unit 202 comprises computer volatile memory 206, an input/output interface 208, and a central processing unit ("CPU") 210. The computer volatile memory 206 stores an operating system 212, an indexing system 214, in-memory indexes 216, an in-memory fresh test table 218, and a dependency table 220. The persistent storage medium 204 stores at least one persistent index 224 and its associated widset 226. In most actual embodiments of the invention multiple persistent index/widset pairs will be stored in the persistent storage medium 204.

Figure 3:
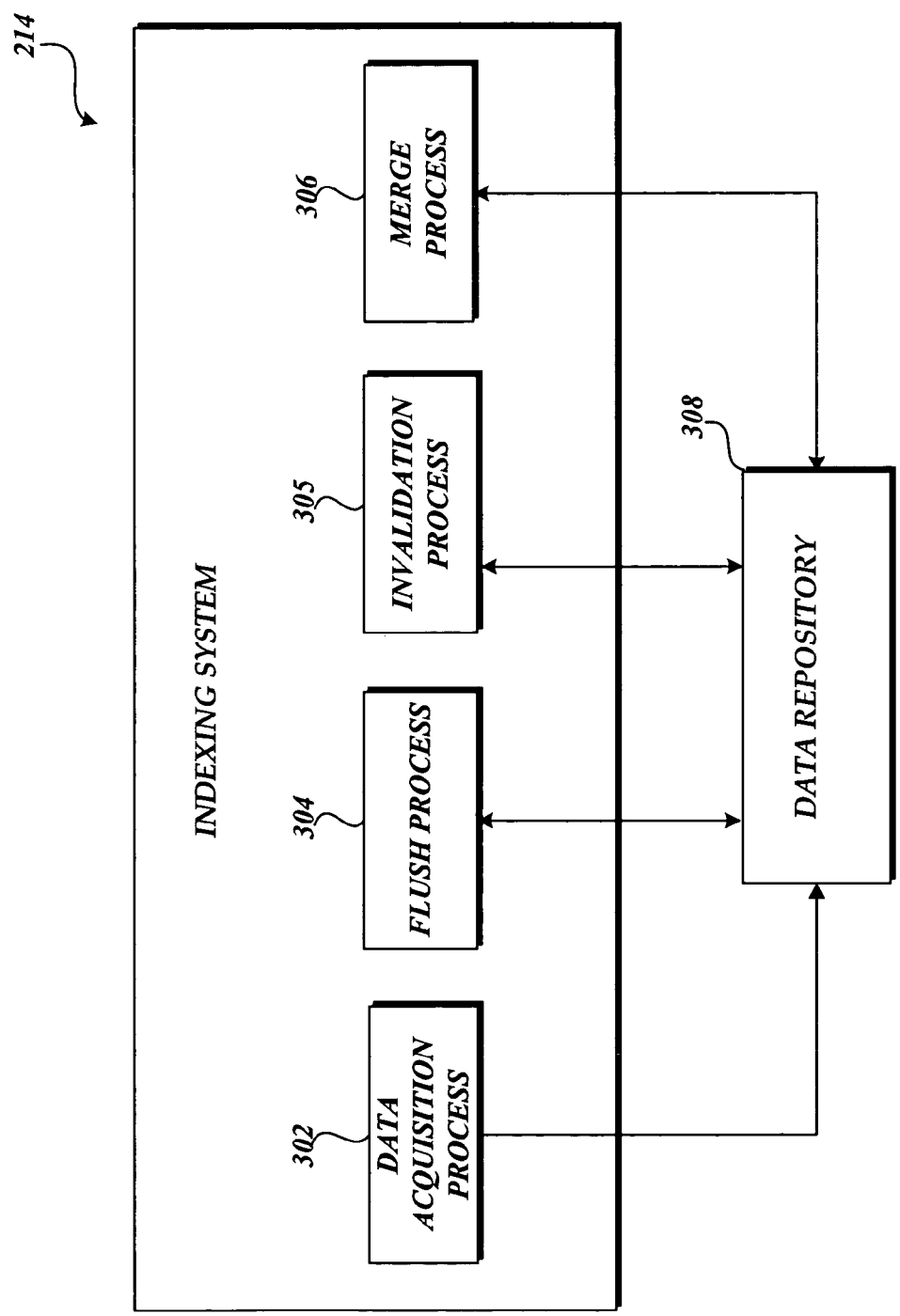
FIG. 3 is a block diagram illustrating one aspect of the present invention, namely, an indexing system.

FIG. 3 is a block diagram illustrating an exemplary embodiment of an indexing system 214 that interacts with an associated data repository 308. The indexing system 214 includes a standard data acquisition process 302. The data acquisition process 302 extracts relevant indexing information from one or more documents. The data acquisition process 302 deposits the indexing information in a new in-memory index 216, the in-memory fresh test table 218, and the dependency table 220, which are part of the data repository 308, as further illustrated in FIG. 4 and described fully below.

The indexing system 214 also contains a flush process 304. In one embodiment f the invention, the flush process 304 is a parallel activity. From time to time, or under certain conditions such as there are too many in-memory indexes, the indexing system 214 initiates the flush process 304 to merge multiple in-memory indexes 216 referencing one or more same documents into a new persistent index 224 in the persistent storage medium 204. The indexing program then erases the multiple in-memory indexes and their corresponding entries from the in-memory fresh test table 218 and the dependency table 220. In doing so, the computer virtual memory is freed periodically, resulting in efficient use of memory space.

Figure 8:
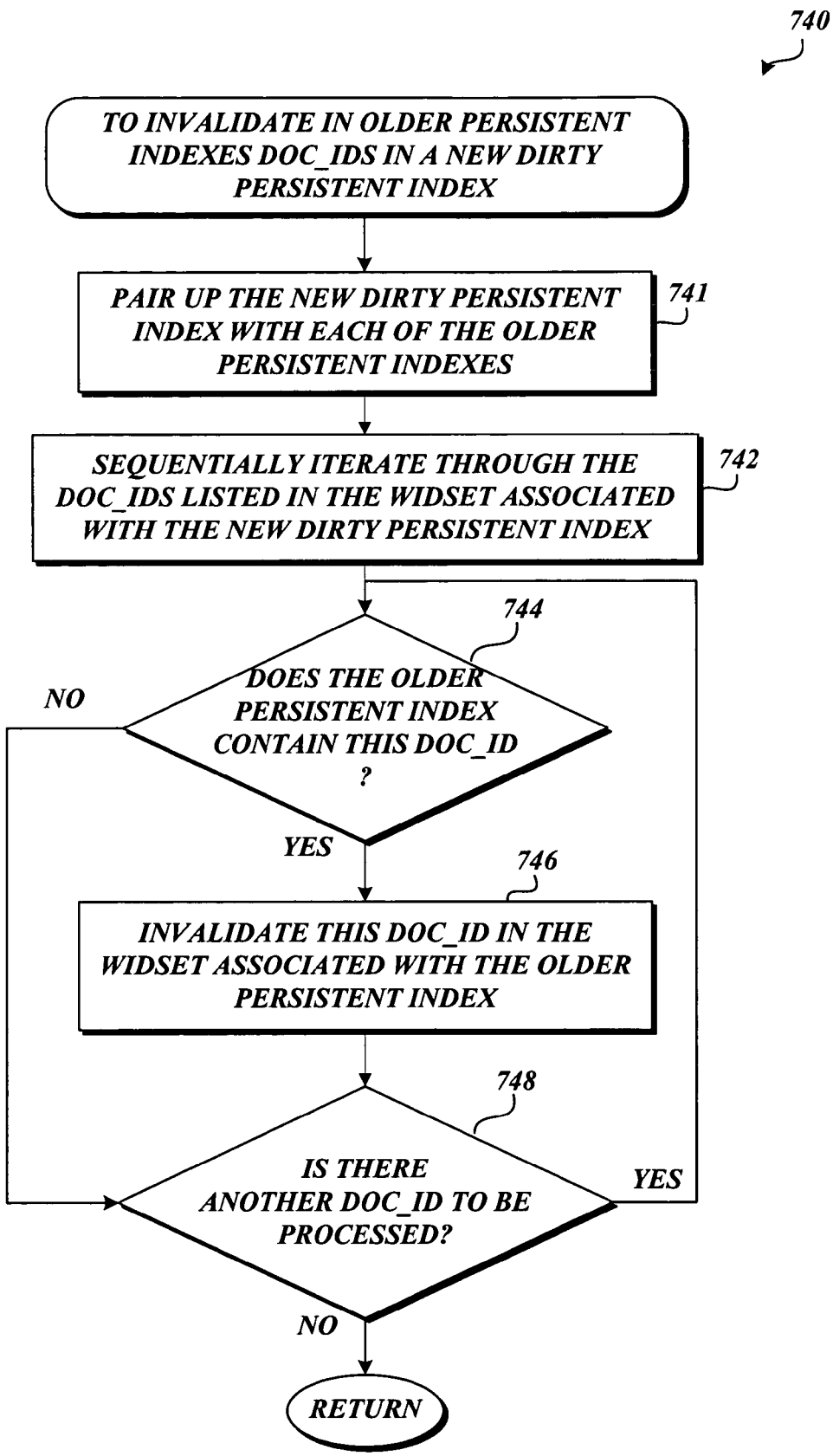
FIG. 8 is a flow diagram illustrating an exemplary routine for invalidating, in older widsets, the Doc_IDs listed in the widset of a newly created persistent index, suitable for use in FIG. 7C.

The indexing system 214 further contains an invalidation process 305. In one embodiment of the invention, the invalidation process 305 is implemented as a parallel activity. The invalidation process 305 marks as invalid, in the widsets associated with older persistent indexes, older versions of the documents referenced by the new persistent index created by the flush process 304. FIG. 8 provides an exemplary illustration of the invalidation process 305 and is discussed in detail below. By default, the widset of the new persistent index created by the flush process 304 is marked as dirty. A dirty widset is marked as clean after going through the invalidation process 305 successfully.

The indexing system 214 may also contain a merge process 306 that, under certain pre-defined conditions, merges multiple sets of a persistent index 224 and its associated clean widset 226 into a new set of a persistent index 224 and its associated clean widset 226. Both the flush process 304 and the merge process 306 are described in detail in a related U.S. patent application titled "System and Method for Building a Large Index" (application Ser. No. 10/714,186, filed on Nov. 14, 2003).

Figure 4:
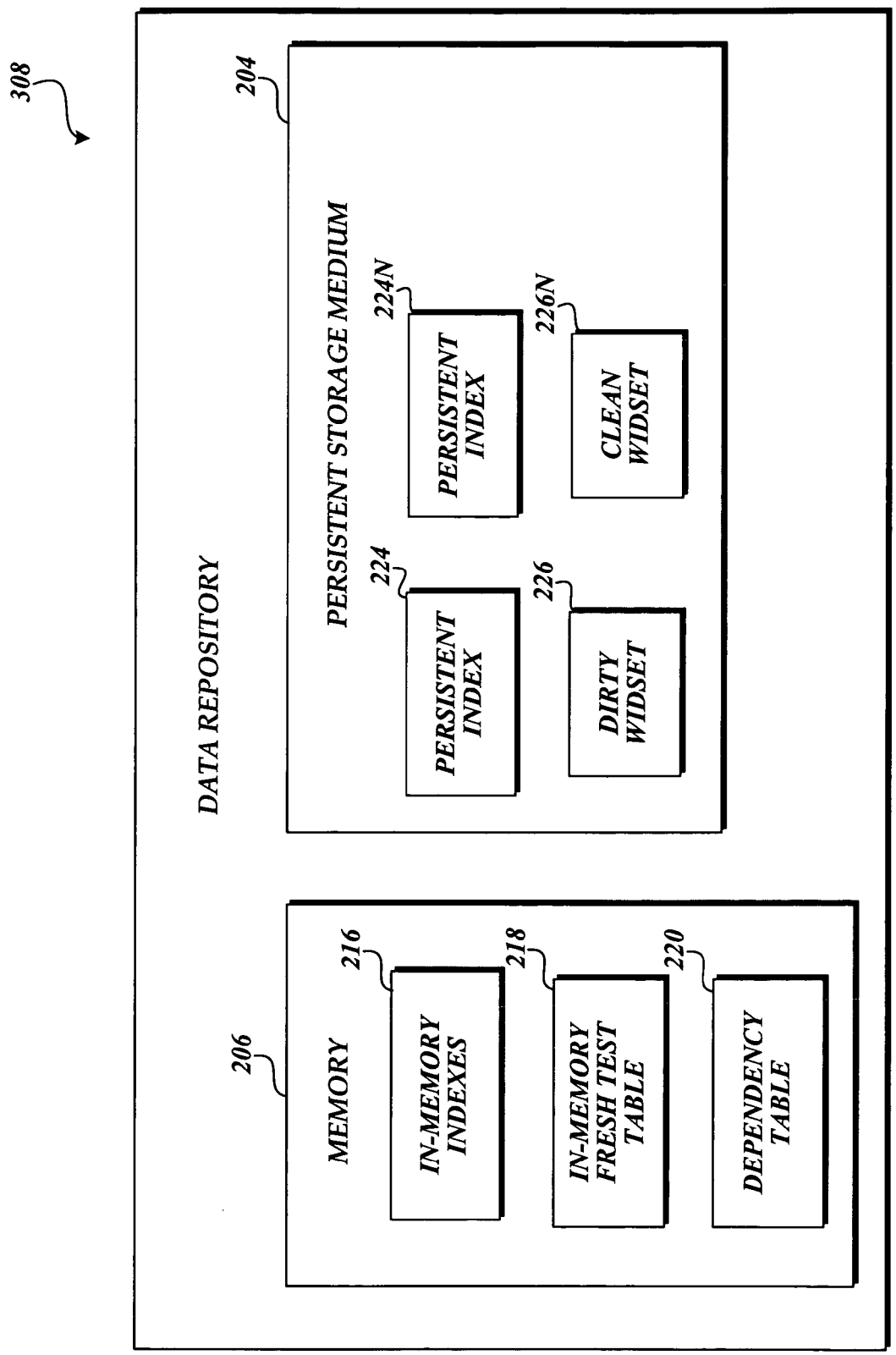
FIG. 4 is a block diagram illustrating an exemplary data repository system suitable for use in FIG. 3.

FIG. 4 illustrates an exemplary embodiment of a data repository 308 suitable for use in FIG. 3. The data repository 308 includes in-memory indexes 216, an in-memory fresh test table 218, and a dependency table 220, all of which reside in the computer virtual memory. The data repository 308 also includes persistent indexes 224, 224N and their associated widsets 226, 226N. Both of these two data structures, i.e., the persistent indexes 224, 224N and their associated widsets 226, 226N, reside in the persistent storage medium 204. A widset is denoted a dirty widset 226 if its persistent index 224 is newly created by merging multiple in-memory indexes 216 that reference one or more same documents and has not gone through an invalidation process 305. A widset is denoted a clean widset 226N after its persistent index 224N has gone through an invalidation process 305 successfully, or is the result of merging multiple persistent indexes with clean widsets.

FIG. 5A illustrates an exemplary embodiment of an in-memory index 216. Each execution of the standard data acquisition process 302, illustrated in FIG. 3, results in a new in-memory index. Therefore, at a given time, there can be multiple in-memory indexes such as in-memory index A (512) through in-memory index N (512N) existing in the virtual memory of a computer system 202. In the illustrated exemplary embodiment of an in-memory index 216, each in-memory index entry includes a key word 514 and a Doc_ID 516 that uniquely identifies the document that contains the key word 514. For example, in FIG. 5A, the in-memory index A (512) contains a key word ABC, which is in the documents represented by the Doc_IDs F1 and F3. The in-memory index A (512) also contains an entry for a key word DEF, which is in the document represented by the Doc_ID F4. In addition, the in-memory index N (512N) contains entries for the key words ABC and XYZ, both of which are in the document represented by the Doc_ID F4.

FIG. 5B illustrates one preferred embodiment of the in-memory fresh test table 218. The in-memory fresh test table 218 stores information indicating the freshness of a document referenced by in-memory indexes. In one embodiment of the invention, freshness of a document is indicated by a time stamp. In one exemplary embodiment of the invention, the in-memory fresh test table 218 contains entries having a Doc_ID 516 and an Index_ID 518. The Index_ID 518 corresponds to the index referencing a version of the document identified by the Doc_ID 516. The entries in the in-memory fresh test table 218 further contain time stamps 520 indicating the order in which the in-memory indexes were created. In one embodiment of the invention, the time stamp 520 is a counter that is incremented whenever a new in-memory index is created. For example, in FIG. 5B, the in-memory fresh test table 218 shows that the in-memory index represented by the Index_ID A references a version of the documents represented by the Doc_IDs F1, F3, F4, respectively. The time stamp 520 for the in-memory index represented by the Index_ID A is 1. The in-memory fresh test table 218 further shows that the in-memory index represented by the Index_ID N contains another version of the document identified by the Doc_ID F4. FIG. 5B also shows that by the time the in-memory index represented by the Index_ID N is created, the time stamp 520 has been incremented to 14.

Preferably, the in-memory fresh test table is implemented as a hash table. As will be readily understood from the foregoing discussion concerning FIG. 1, using a memory-mapped array data structure to store indexing information requires a block of continuous virtual memory. Contrariwise, using a hash table data structure to store indexing information does not require a block of continuous virtual memory. The indexing information can be split and stored in multiple hash tables, which can reside in disjointed locations of virtual memory. As a result, the present invention enables indexing information to be stored in patches of virtual memory, thus improving the utilization of virtual memory space.

FIG. 5C illustrates an exemplary embodiment of a dependency table 220. The dependency table 220 illustrated in FIG. 5C contains entries having a new Index_ID 524 and an old Index_ID 526. The two in-memory indexes represented by these two Index_IDs contain different versions of the same document. For example, the dependency table 220 shown in FIG. 5C has a new Index_ID 524 entry designated Index_ID N and a corresponding old Index_ID 526 entry designated Index_ID A. As FIGS. 5A and 5B show, both the in-memory indexes A and N reference the document represented by Doc_ID F4.

The dependency table 220 ensures that in-memory indexes referencing different versions of one more same documents are merged into one new persistent index during the execution of the flush process 304 ("flush"). The dependency table 220 also ensures that, if new in-memory indexes are created while other in-memory indexes containing one or more of the same Doc_IDs are being flushed, the new in-memory indexes are prevented from being flushed before the ongoing flush ends. As a result, when multiple in-memory indexes are selected for a flush, an in-memory index will be included in the flush together with all the in-memory indexes it depends on, or are dependent on it ("dependency closure"), by the information shown in the dependency table 220. For example, assuming the in-memory index A contains Doc_IDs F1, F3, and F4, the in-memory index B contains Doc_IDs F3 and F5, the in-memory index C contains Doc_IDs F5 and F6, and the in-memory index N contains Doc_ID F4, all these four indexes are correlated. Hence they are in the same dependency closure and will be in the same flush. Further, no in-memory index is included in a new flush if its dependency closure has an in-memory index that is in the process of being flushed. A flush started earlier has to end before the newer in-memory indexes that depend on the ones being flushed can be flushed. When a flush ends, all the information relative to the in-memory indexes that were in the flush is erased from the virtual memory, including the in-memory indexes, the entries in the in-memory fresh test table, and the entries in the dependency table. In-memory indexes that were blocked from being flushed because of their dependencies can then be considered for further flushes.

Figure 6:
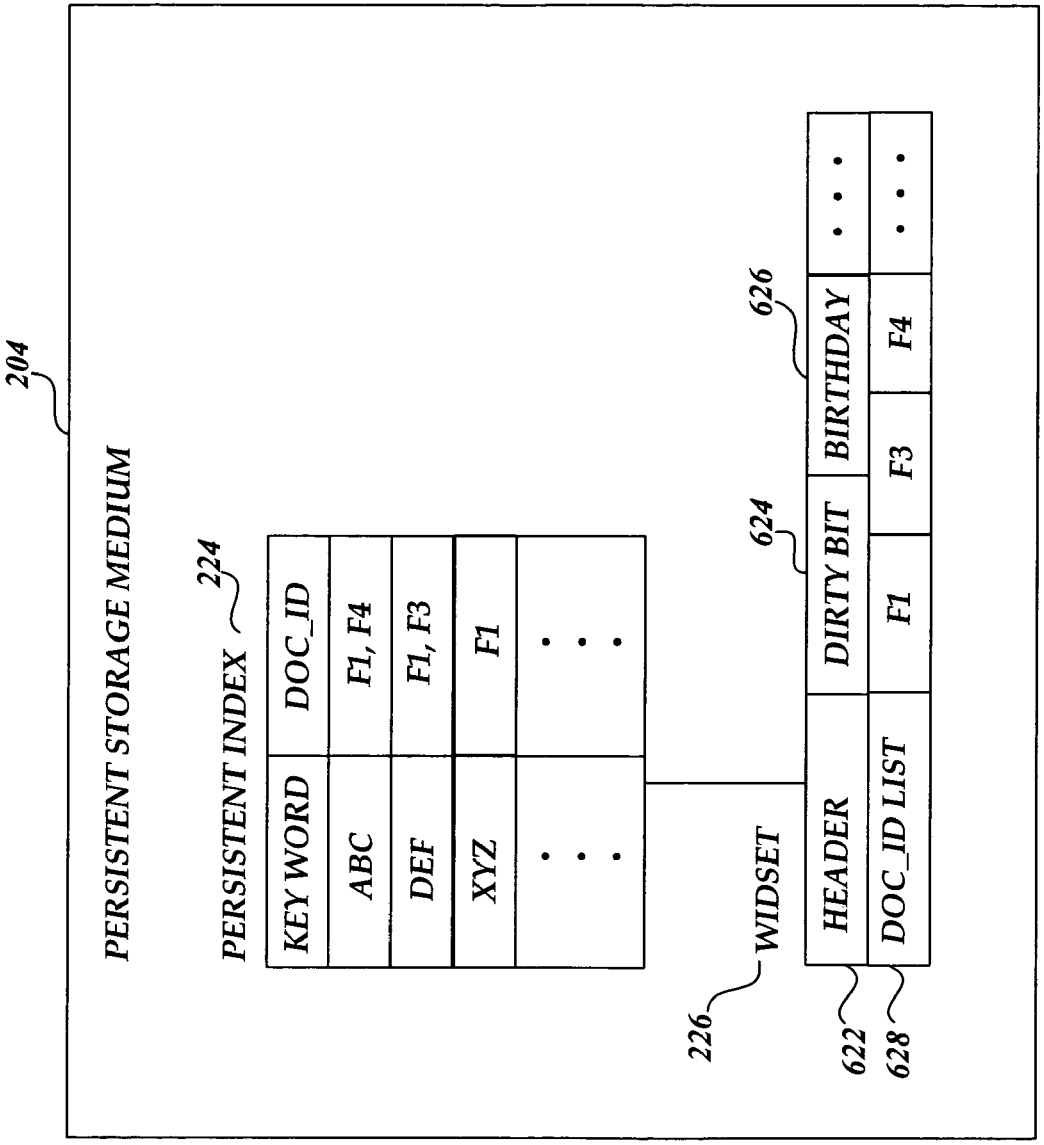
FIG. 6 is a diagram illustrating one exemplary embodiment of a persistent index and its associated widset.

FIG. 6 illustrates an exemplary embodiment of a persistent index 224 and its associated widset 226, which, as noted above, are stored in the persistent storage medium 204. The persistent index 224 preferably contains the same type of data that is stored in an in-memory index such as the in-memory index A (512) and the in-memory index N (512N) illustrated in FIG. 5A. The data in a persistent index is stored in a highly compressed format, whereas the data in an in-memory index is stored in a format that is less compressed and therefore allows a higher access speed. The indexing data in an in-memory index becomes persistently stored in a persistent index through the flush process 304 illustrated in FIG. 3. Using the correlation information provided, for example, by a dependency table 220, the flush process 304 ensures that a document referenced by an in-memory index is fresher than the same document referenced by a persistent index.

Additionally, each persistent index 224 has an associated widset 226. The widset data structure 226 contains a list of all the Doc_IDs included in the related persistent index 224. Thus, in the example shown in FIG. 6, the widset 226 contains a Doc_ID list 628 having the Doc_IDs F1, F3, and F4, etc., which are the Doc_IDs in the persistent index 224. The widset 226 further contains a header 622. The header 622 includes a dirty bit 624 that, when set, indicates that this persistent index 224 is newly created by merging multiple in-memory indexes referencing one or more same documents. An invalidation process 305 (FIG. 3) invalidates, in older widsets, the Doc_IDs contained in a dirty widset. The invalidation process 305 then marks the dirty widset as clean by changing the state of the dirty bit. Preferably, the header 622 of the widset also contains a Birthday value 626. One embodiment of the invention associates a Birthday property with each catalog of persistent indexes. The value of the Birthday property is incremented whenever a new persistent index appears; and the incremented Birthday value is recorded in the header of the widset associated with the new persistent index. As a result, a specific dirty widset may be distinguished from other dirty widsets that contain some of the same Doc_IDs.

Figure 7A:
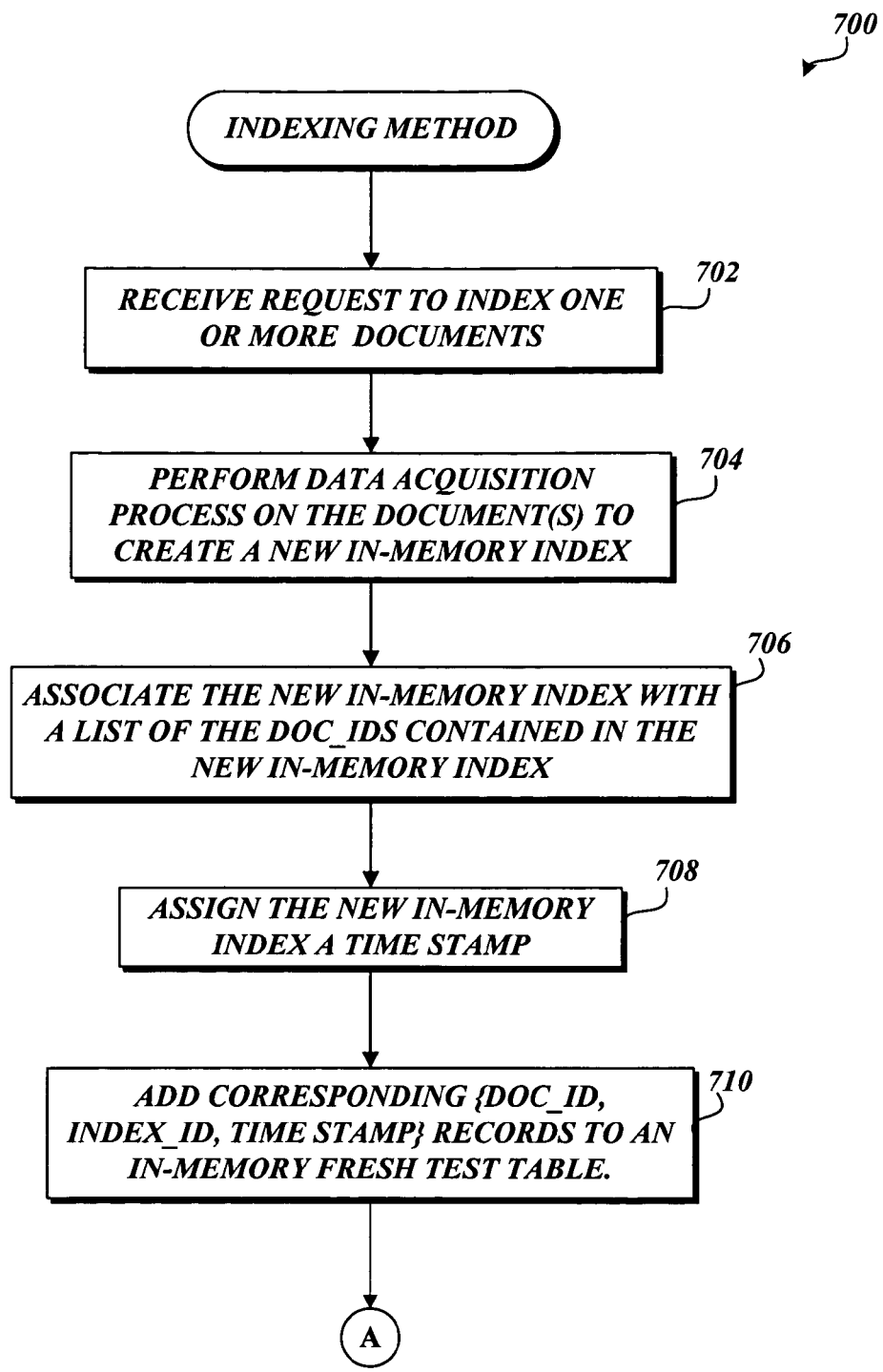
FIGS. 7A-7C illustrates a flow diagram illustrating an exemplary indexing method.
Figure 7B:
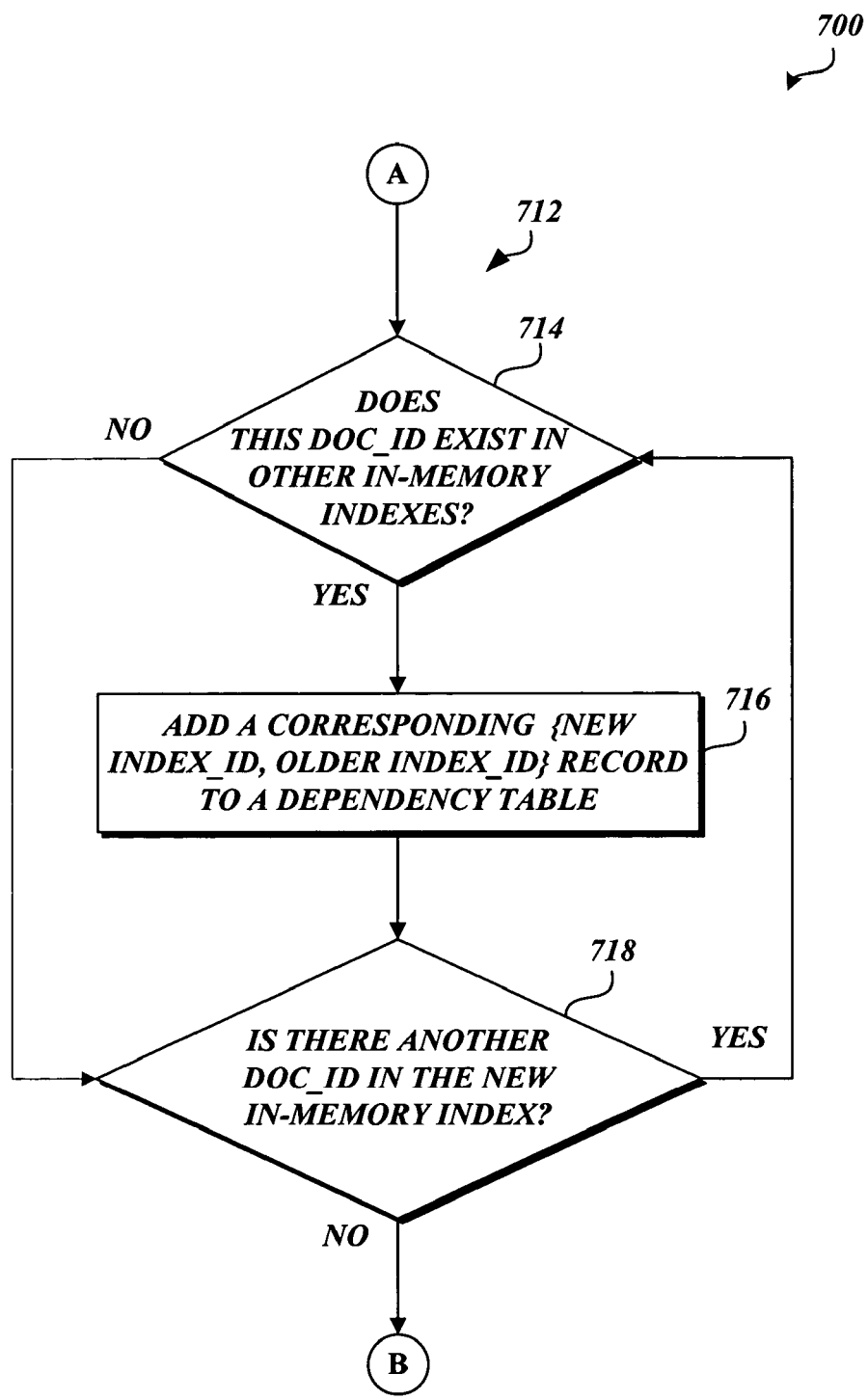
Figure 7C:
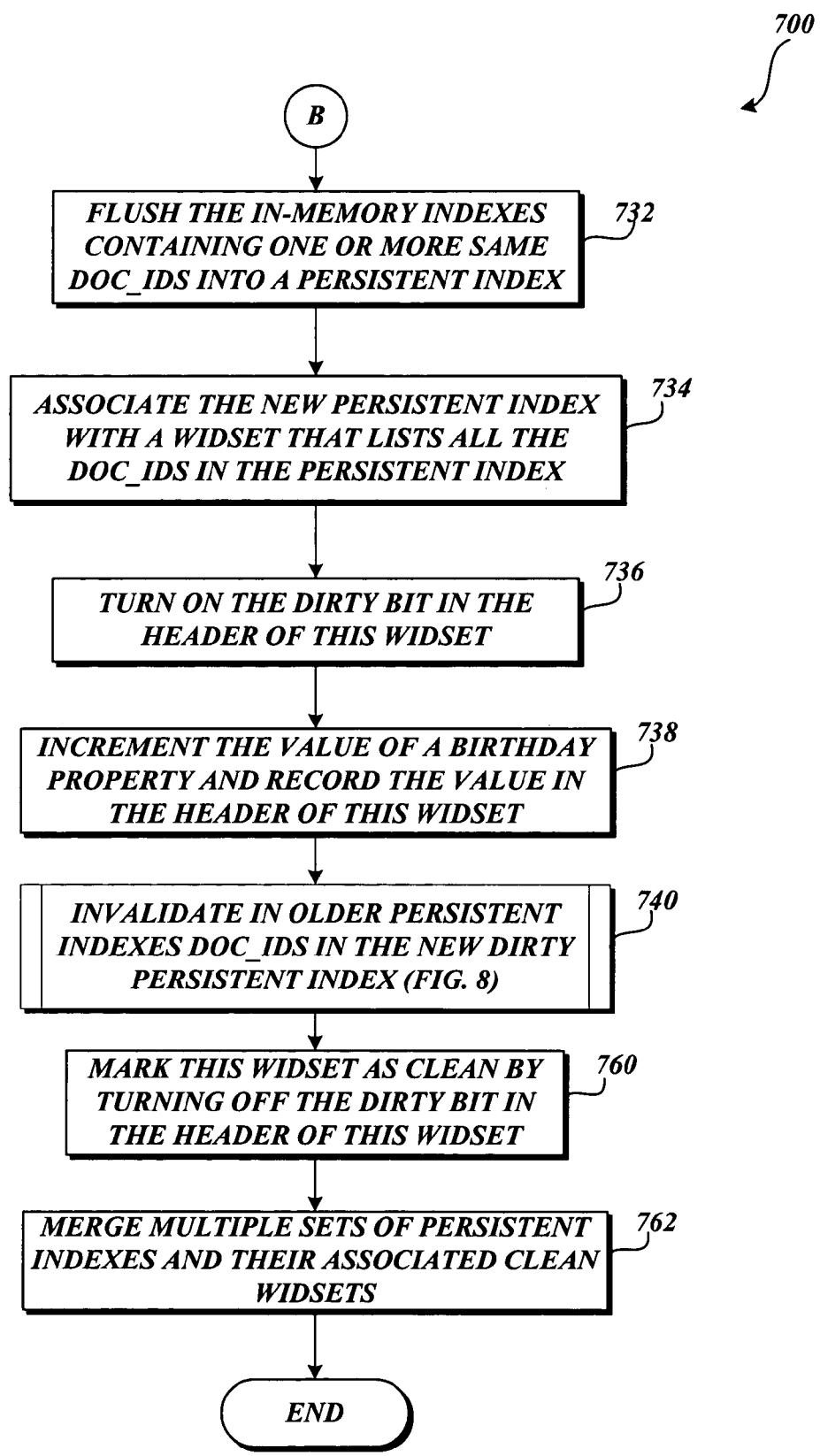

FIGS. 7A-7C are a flow diagram illustrating an exemplary indexing method 700, using the indexing system 214 illustrated in FIG. 3 and the data repository 308 illustrated in FIG. 4. The indexing method 700 generates an in-memory index referencing one or more documents. As noted above, multiple in-memory indexes referencing one or more same documents may be merged into one persistent index and erased from the virtual memory through a flush process 304, making more virtual memory available.

The indexing method 700 first receives a request to index one or more documents. See block 702. The indexing method 700 then performs a standard data acquisition process 302 on the documents received to create a new in-memory index. See block 704. As illustrated in FIG. 5A, an in-memory index contains entries having a key word and the corresponding Doc_IDs representing the documents containing this key word. The indexing method 700 also assigns the new in-memory index a unique Index_ID. In one exemplary embodiment of the invention, the indexing method 700 associates this new in-memory index with a list containing the Doc_IDs included in the new in-memory index. See block 706. After creating the new in-memory index, the indexing method 700 assigns the new in-memory index a time stamp. See block 708. The indexing method 700 then adds to the in-memory fresh test table a record of the type {Doc_ID, Index_ID, time stamp} for each document referenced by the new in-memory index. See block 710. The in-memory fresh test table indicates the freshness of the document referenced by an in-memory index by the time stamp showing when the in-memory index was created. The indexing method 700 then proceeds to FIG. 7B via continuation terminal A.

From terminal A (FIG. 7B), the indexing method 700 iterates 712 through all the Doc_IDs contained in the new in-memory index. For each of the Doc_IDs, the indexing method 700 tests to see if this Doc_ID exists in other in-memory indexes. See decision block 714. If the answer to decision block 714 is YES, meaning this Doc_ID is contained in an older in-memory index, a new record of type {new Index_ID, older Index_ID} is added to a dependency table. This action occurs for each older in-memory index that contains this Doc_ID. See block 716. The resulting record is used to prevent the new in-memory index from being flushed to persistent storage medium 204 for the duration of the life of the older in-memory index, if the older in-memory index was being flushed when the new index appeared. Such a record can also be used to cause the new in-memory index and the older in-memory index to be selected together in one flush. This is done so that it is impossible for the information corresponding to an older version of the document to arrive on the persistent storage medium 204 after the information corresponding to a newer version of the same document. Doing so guarantees that any version of a document that is on the persistent storage medium is older than a version of the same document that is in computer virtual memory. From block 716, the indexing method 700 proceeds to check if there is another Doc_ID in the new in-memory index that needs to be processed. See decision block 718. If the answer is YES, the indexing method 700 moves back to decision block 714 to check if this Doc_ID exists in other older in-memory indexes. If the answer to decision block 718 is NO, the indexing method 700 proceeds to continuation terminal B. If the answer to decision block 714 is NO, meaning that the Doc_ID exists only in this new memory index, the indexing method 700 proceeds to decision block 718 to check if there is another Doc_ID in the new in-memory index that needs to be processed.

At this stage, the new in-memory index is ready for queries and can also be selected to be flushed to the persistent storage medium. From terminal B (FIG. 7C), periodically, using the flush process 304 illustrated in FIG. 3, the indexing method 700 selects multiple in-memory indexes referencing or more same documents and merges these in-memory indexes into a persistent index, which is stored in the persistent storage medium. See block 732. The dependency table 220 is used here to block some in-memory indexes from being flushed until some already started flushes end and can also force some in-memory indexes to be taken together in a flush. The indexing method 700 also erases from virtual memory the multiple in-memory indexes and their relevant entries in the in-memory fresh test table and the dependency table.

The indexing method 700 then associates the newly created persistent index with a widset that lists all the Doc_IDs contained by this persistent index. See block 734. FIG. 6 illustrates one embodiment of a widset. As noted above, a widset has a header that contains information about the widset. A widset can have multiple formats. In one form, a widset created as a result of a flush contains an enumeration of the Doc_IDs contained by the newly created persistent index. The widsets created as a result of flushes are likely to be smaller than all other widsets and also need to be sequentially iterated by the invalidation process 305. Having all the Doc_IDs contained by a persistent index enumerated in an array makes sequential iteration easy. Other widsets, such as the ones created by the merge process 306 illustrated in FIG. 3, do not need to be sequentially iterated and may have a different format. The format indication is contained in the header of the widset.

Widsets created as a result of flushes are set to be dirty by turning on the dirty bit in the header of this widset. See block 736. The setting of the dirty bit indicates that the persistent index the widset is associated with is newly created as a result of a flush. The order of the dirty widset is also important because a dirty widset could contain a Doc_ID contained by an older dirty widset. The Birthday values in the headers of widsets are used to distinguish the version of the document represented by a Doc_ID in one dirty widset from a different version of the document represented by the same Doc_ID in another dirty widset. As noted above, the value of the Birthday property associated with each catalog of persistent indexes is incremented and recorded in the header of the widset associated with a new persistent index. As shown in block 738, the indexing method 700 increments the value of the Birthday property and recorded the incremented value in the header of the new dirty widset.

After creating the new dirty persistent index, the indexing method 700 initiates an invalidation process 740. The invalidation process 740 invalidates, in older persistent indexes, the Doc_IDs in the new dirty persistent indexes. FIG. 8 illustrates an embodiment of an invalidation process 740. The invalidation process 740 first pairs up the new dirty persistent index with each of the older persistent indexes. See block 741. In one embodiment of the invention, this pairing action also includes paring the new dirty persistent index with the persistent index that is resulted from the merge process 306 illustrated in FIG. 3.

For each pair of the new dirty persistent index and an older persistent index, the invalidation process 740 first sequentially iterates through the Doc_IDs listed in the widset associated with the new dirty persistent index (source widset). See block 742. For each such a Doc_ID, the invalidation process 740 checks if the older persistent index contains this Doc_ID. See decision block 744. If the answer is YES, the invalidation process 740 invalidates the Doc_ID in the widset associated with the older persistent index. See block 746. The invalidation process 740 then proceeds to check if there is another Doc_ID in the new dirty persistent index to be processed. See decision block 748. If the answer to the decision block 744 is NO, meaning that the older persistent index does not contain the Doc_ID, the invalidation process 740 proceeds to decision block 748 to check if there is another Doc_ID in the new dirty persistent index to be processed. If the answer to decision block 748 is YES, the invalidation process 740 loops back to decision block 744 to check if the older persistent index contains this Doc_ID. If the answer to decision block 748 is NO, meaning the process 740 has iterated through all the Doc_IDs in the new dirty persistent index, the invalidation process 740 terminates. In one embodiment of the invention, the invalidation process 740 proceeds in parallel for each pair of the new dirty persistent index and an older persistent index.

Returning to FIG. 7C, the indexing method 700 next proceeds to mark the new dirty widset as clean by changing the dirty bit in the header of the widset. See block 760. A widset is said to be clean when all invalidation processes 740 using it as the source widset complete successfully, i.e., when all older versions of the documents referenced by the new persistent index are marked invalid in all older persistent indexes. In the illustrated exemplary embodiment of the invention, periodically the indexing method 700 uses the merge process 306 illustrated in FIG. 3 to merge multiple persistent indexes whose associated widsets are clean. See block 762. The clean widset associated with the persistent index resulting from the merge contains all the Doc_IDs that are still valid in the widsets of the merged persistent indexes. The indexing method 700 then ends.

Figure 9:
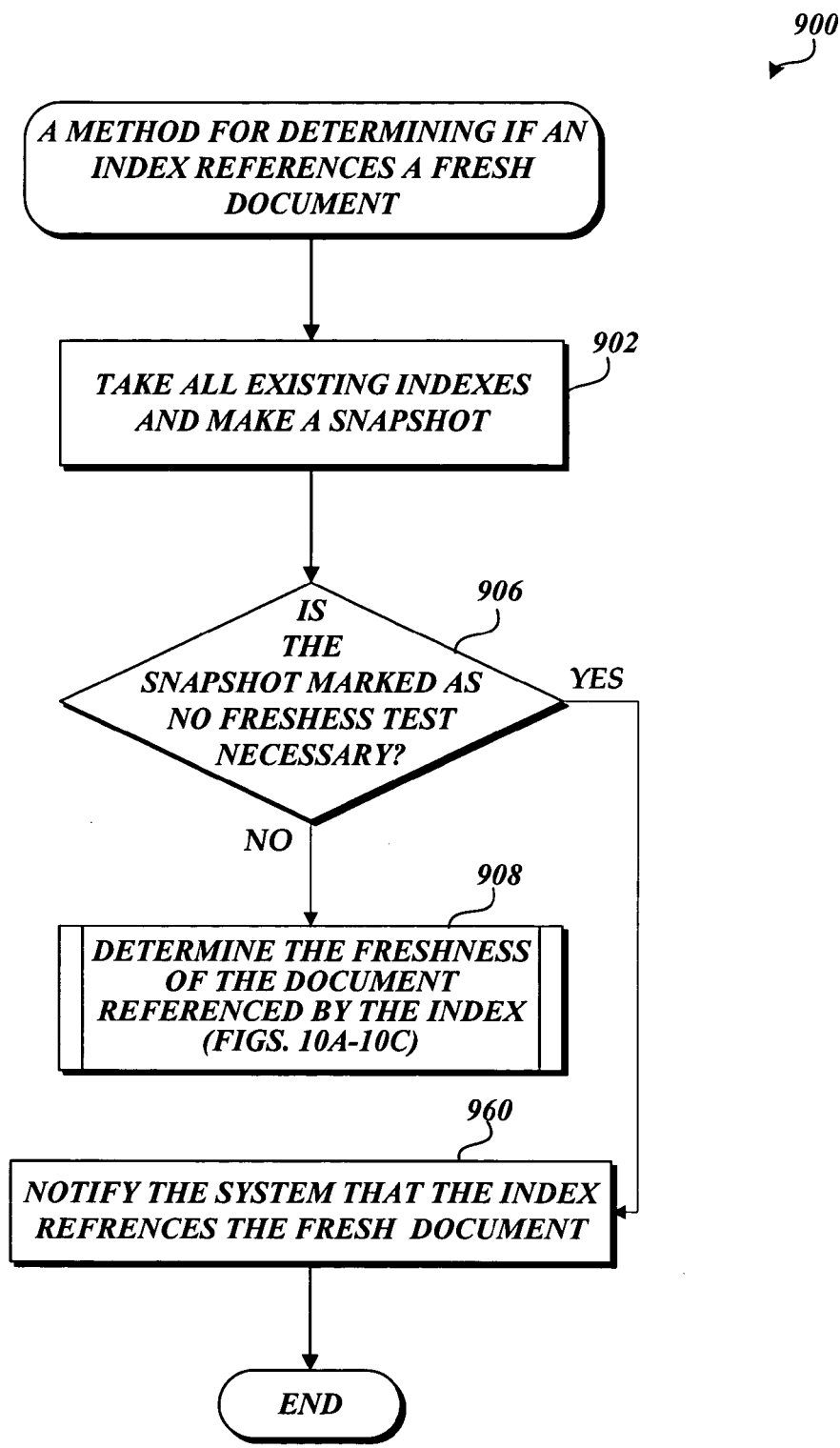
FIG. 9 is a flow diagram illustrating an exemplary method for determining whether an index referencing a document actually references the freshest version of the document.

FIG. 9 illustrates an exemplary method 900 for determining whether an indexing referencing a document ("index in focus") actually references the freshest version of the document ("fresh document"). The method 900 starts by taking a snapshot of all the existing indexes that are present at a certain moment. See block 902. These indexes can be in-memory indexes or persistent indexes. No index can disappear if a snapshot contains it. In one embodiment of the invention, a snapshot also has a time stamp, which is equivalent to the time stamp associated with a new in-memory index. This is to say, for example, if the value of the time stamp, such as the time stamp 520 illustrated in FIG. 5B, associated with the last new in-memory index is 14, then the value of the time stamp associated with the snapshot is 15. The value of the time stamp associated with a snapshot can be used to determine if an index comes into existence after the creation of the snapshot.

The method 900 then proceeds to check if the snapshot is marked as "no fresh test necessary." See decision block 906. A snapshot is marked as "no freshness test necessary" if none of its indexes has a dependency closure or has been invalidated by the invalidation process 740. This means that the indexes in the snapshot reference one or more documents that are newly created. By marking such a snapshot as "no freshness test necessary", the speed of performance is enhanced for any process that needs to assess the freshness of one or more indexes. For example, if the snapshot is marked as "no freshness test necessary", the method 900 concludes after notifying the operating system 212 that the index in focus contains the fresh document. See block 960.

If the answer to decision block 906 is NO, meaning the snapshot is not marked as "no fresh test necessary", the method 900 proceeds to a process 908. The process 908 performs a freshness test on the index in focus to determine whether the index in focus references the fresh document ("freshness testing process").

Figure 10A:
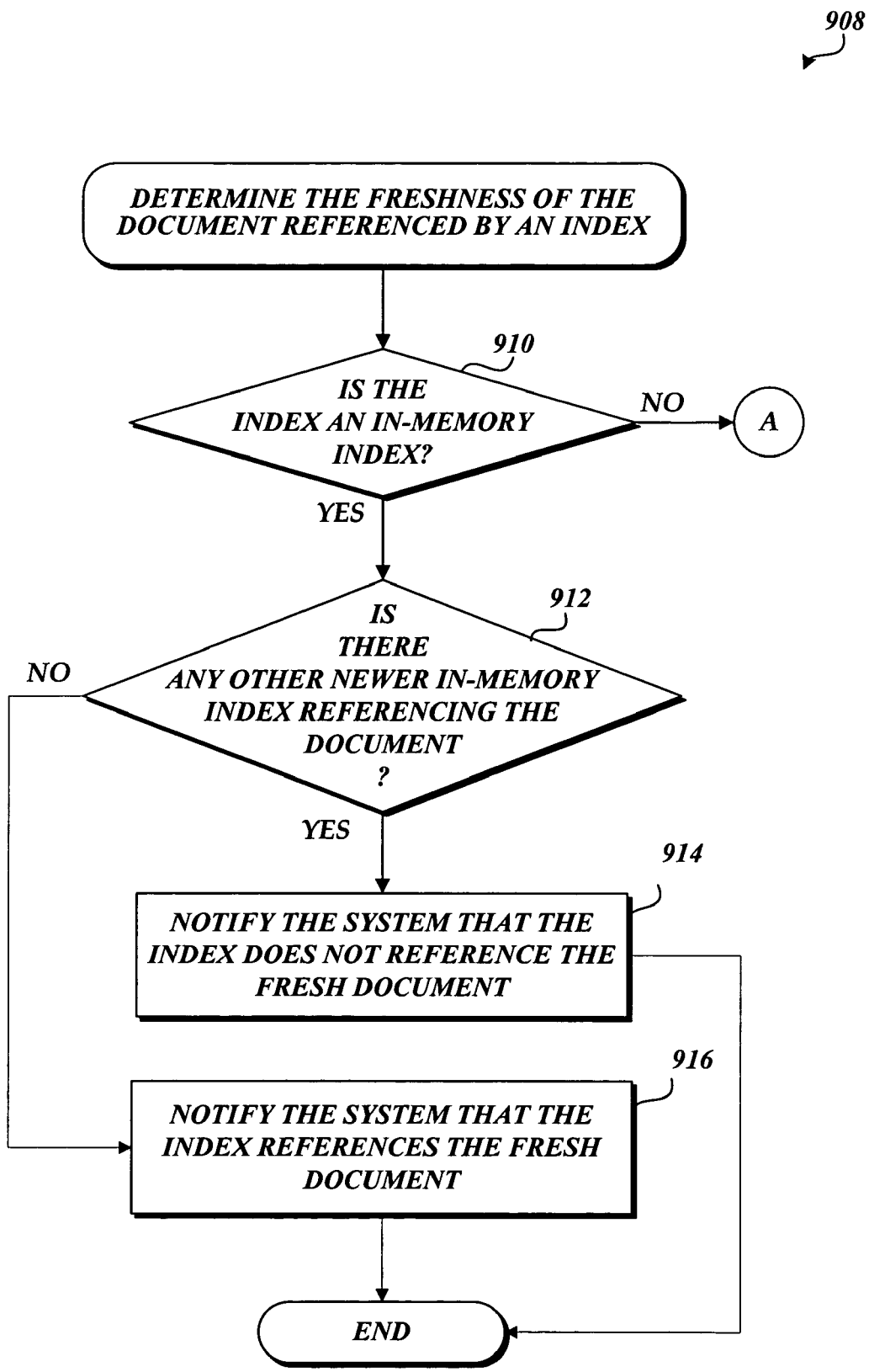
FIGS. 10A-10C illustrates a flow diagram illustrating an exemplary routine for determining the freshness of a document referenced by an index, suitable for use in FIG. 9.
Figure 10B:
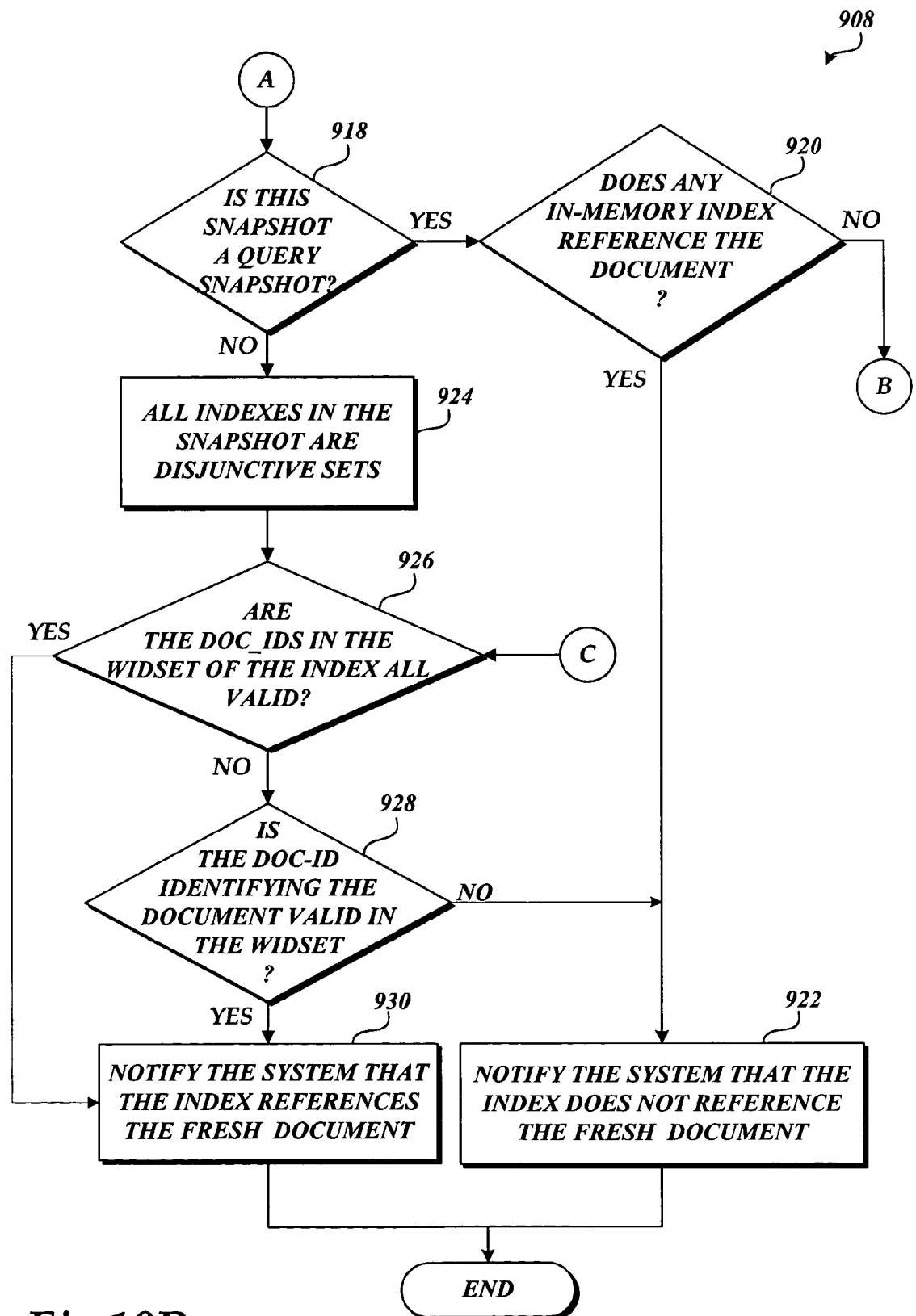
Figure 10C:
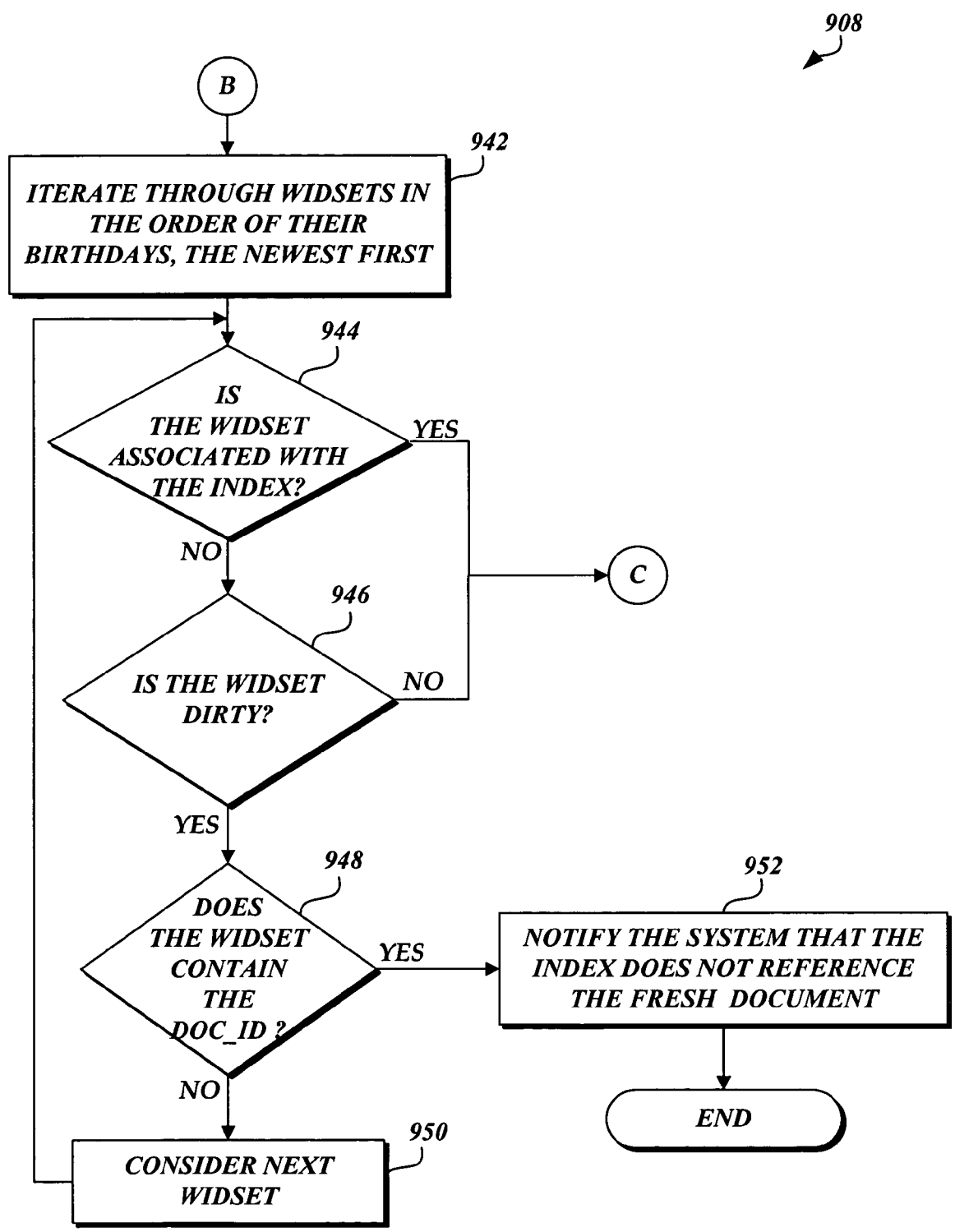

FIGS. 10A-10C illustrates an exemplary freshness testing process 908. The freshness testing process 908 first checks to determine if the index in focus is an in-memory index or a persistent index. See decision block 910. If the index in focus is an in-memory index, the freshness testing process 908 proceeds to check if there is another newer in-memory index containing the Doc_ID identifying the fresh document (the Doc_ID) by looking into the in-memory fresh test table 218. See decision block 912. In one embodiment of the invention, if the value of the time stamp of an in-memory index is higher than the value of the time stamp of the snapshot, then there is a newer in-memory index containing the Doc_ID. The freshness testing process 908 thus proceeds to notify the operating system 212 that the index in focus does not reference the fresh document. See block 914. The freshness testing process 908 then ends. If the answer to decision block 912 is NO, meaning there is no other newer in-memory index containing the Doc_ID, the freshness testing process 908 proceeds to notify the operating system 212 that the index in focus references the fresh document. See block 916. The freshness testing process 908 then ends.

If the index in focus is a persistent index, the freshness testing process 908 proceeds to a continuation terminal A. From terminal A (FIG. 10B) the freshness testing process 908 proceeds to check if the snapshot is a query snapshot. See decision block 918. A query seeks out, among the multiple indexes, the freshest version of documents containing a particular keyword. A query snapshot takes all indexes that are present at a certain moment and prevents them from being deleted while the query is going on.

If the answer to decision block 918 is YES, meaning the snapshot is a query snapshot, the freshness testing process 908 proceeds to check if any in-memory index in the query snapshot contains the Doc_ID. See decision block 920. If the answer is NO, the freshness testing process 908 proceeds to continuation terminal B. If the answer is YES, meaning there is an in-memory index containing the Doc_ID, the freshness testing process 908 proceeds to notify the operating system 212 that the index in focus, which is a persistent index, does not reference the fresh document. See block 922.

A NO answer at decision block 918 indicates that this snapshot is not a query snapshot; instead it is a merge snapshot. A merge snapshot takes a set of clean persistent indexes and prevents them from disappearing for the duration of the merge process 306. All indexes in the merge snapshot are disjunctive sets. See block 924. The freshness testing process 908 then proceeds to check if all the Doc_IDs in the widset of the index in focus are valid, meaning the invalidation process 740, as discussed above, has failed to invalidate them. If the answer is YES, meaning the widset of the index in focus contains the Doc_ID and it remains valid, the freshness testing process 908 proceeds to notify the operating system 212 that the index in focus references the fresh document. See block 930. The freshness testing process 908 ends.

If the answer at decision block 926 is NO, meaning some of the Doc_IDs in the widset of the index in focus have been invalidated, the freshness testing process 908 proceeds to check if the Doc_ID is still valid in the widset. See decision block 928. If the answer is NO, the freshness testing process 908 notifies the operating system 212 that the index in focus does not reference the fresh document. If the answer is YES, the freshness testing process 908 notifies the operating system 212 that the index in focus references the fresh document. The freshness testing process 908 then ends.

In the case that the index in focus is a persistent index and there is no in-memory index containing the Doc_ID, from terminal B (FIG. 10C) the freshness testing process 908 proceeds to iterate through the widsets of the persistent indexes contained in the snapshot in the order of their Birthday values. The iteration starts with the newest widset, i.e., the widset with the highest Birthday value. See block 942. For each widset, the freshness testing process 908 checks to see if the widset is associated with the index in focus. See decision block 944. If the widset is the one associated with the index in focus, the freshness testing process 908 proceeds to continuation terminal C, which starts with decision block 926 (FIG. 10B). If the widset is not associated with the index in focus, the freshness testing process 908 proceeds to check if the widset is dirty. See decision block 946. If the widset is clean, the freshness testing process 908 proceeds to continuation terminal C. If the widset is dirty, the freshness testing process 908 proceeds to check if the widset contains the Doc_ID. See decision block 948. If the answer is NO, the freshness testing process 908 proceeds to consider the next widset by looping back to decision block 944. See block 950. If the dirty widset, which is not associated with the index in focus, contains the Doc_ID, the freshness testing process 908 notifies the operating system 212 that the index in focus does not reference the fresh document. See block 952. The freshness testing process 908 ends.

As the above discussion shows, the method 900 is optimized in several aspects. First, all determinations of freshness can be performed in relation to a set of indexes in a snapshot. A snapshot includes all indexes that are present at a certain moment and ensures that no index will disappear if it is included in a snapshot. Secondly, when indexing a set of documents that are newly created, the resultant in-memory indexes reference the most up-to-date version of the documents. Hence, a snapshot including only these indexes is marked as "no fresh test necessary." The speed of performing the method 900 is therefore increased by not performing a freshness test for the indexes referencing newly created documents.

While the presently preferred embodiment of the invention has been illustrated and described, it will be appreciated that The embodiments of the invention in which an exclusive property or privilege is claimed are defined as follows:

1. In a computer system including a volatile memory and a persistent storage medium, a method for indicating the freshness of changeable data associated with a container, comprising:

updating a fresh test table stored in the volatile memory of the computer system ("in-memory fresh test table") with entries identifying each item of changeable data associated with a new container in the volatile memory ("in-memory container") each time a new in-memory container is created;

creating a new container stored in the persistent storage medium ("persistent container") by merging all the in-memory containers associated with the at least one same item of changeable data;

associating the new persistent container with a list identifying all items of changeable data associated with the new persistent container, wherein the list associated with the new persistent container further includes a Birthday value recorded in a header of a widset associated with the new persistent container;

incrementing the Birthday value in the list associated with the new persistent container when the new persistent container appears in the list; and marking as invalid older versions of the items of changeable data in lists associated with older persistent containers, prior to marking as invalid older versions of the items of changeable data, initiating an invalidation process comprising:
pairing up the new persistent containers with the older persistent containers,
iterating sequentially through the changeable data associated with the new persistent containers,
determining whether the older persistent container contains the changeable data,
in response to determining that the older persistent container contains the changeable data, marking as invalid the older versions of the items of changeable data, and in response to determining that the older persistent container does not contain the changeable data, determining whether there is another changeable data that has to be processed.

2. The method of claim 1, wherein the in-memory fresh test table is a hash table.

3. The method of claim 1, wherein creating a new container stored in the persistent container by merging all in-memory containers associated with the at least one same item of changeable data further comprises:

correlating the in-memory containers associated with the at least one same item of changeable data comprising entering, in a dependency table stored in the volatile memory, entries identifying the new in-memory container and any older in-memory container associated with the at least one same items of changeable data; and deleting the in-memory containers, and their entries in the in-memory fresh test table and the dependency table after the merge.

4. The method of claim 1, wherein the new in-memory container is associated with the list identifying all the items of changeable data associated with the new in-memory container, further comprising removing lists associated with the in-memory containers after the merge.

5. The method of claim 1, wherein the list associated with the new persistent container further comprises a data item called dirty bit, further comprising:

setting the dirty bit before the list goes through the invalidation process; and resetting the dirty bit when all older versions of the changeable data associated with the new persistent container are marked invalid in the lists associated with all the older persistent containers.

6. A method of determining if a container of a plurality of containers that is associated with a particular item of changeable data is associated with the freshest version of the item of changeable data, each of the plurality of containers capable of being associated with one different version of the item of changeable data, comprising:

taking a snapshot of existing containers, wherein the snapshot has a snapshot time stamp;

determining whether the snapshot is marked as no freshness test necessary;

in response to determining that the snapshot is marked as no freshness test necessary, marking the snapshot as no freshness test necessary if all the existing containers are associated with newly created changeable data, wherein marking the snapshot comprising indexes that have at least one of the following: no dependencies and has been invalidated; and in response to determining that the snapshot is not marked as no freshness test necessary, determining the freshness of the item of changeable data associated with the container, wherein determining the freshness of the item of changeable data associated with the container comprises:

determining whether the container is an in-memory container, in response to determining that the container is an in-memory container, determining that the container is associated with a freshest version, having a time stamp, of the item of changeable data if the snapshot time stamp has a value less than the snapshot time stamp, and in response to determining that the container is not an in-memory container, determining whether the snapshot is a query snapshot, the query snapshot comprising taking present containers and preventing the containers from being deleted.

7. The method of claim 6, wherein determining the freshness of the item of changeable data associated with the container comprises deciding that the container is associated with the freshest version of the item of changeable data if the snapshot is marked as no freshness test necessary.

8. The method of claim 6, wherein the snapshot includes in-memory containers and persistent containers and wherein determining the freshness of the item of changeable data associated with the container comprises deciding that the container, if it is an in-memory container, is associated with the freshest version of the item of changeable data when no newer in-memory container is associated with the item of changeable data.

9. The method of claim 6, wherein the snapshot includes in-memory containers and persistent containers and wherein determining the freshness of the item of changeable data associated with the container comprises deciding that the container is associated with the freshest version of the item of changeable data if:

the container is a persistent container;
no in-memory container is associated with the item of changeable data; and
a list associated with the persistent container identifies the item of changeable data as valid.

10. A computer system for indicating the freshness of an item of changeable data associated with a container, comprising:
   (a) a computer volatile memory;
   (b) a persistent storage medium; and
   (c) a data processor coupled with the computer volatile memory and the persistent storage medium for:
      (1) updating a fresh test table stored in the volatile memory ("in-memory fresh test table") with entries identifying each item of changeable data associated with a new container in the volatile memory ("in-memory container") each time a new in-memory container is created, the fresh test table comprising at least one changeable data identification, at least one index identification, and at least one time stamp;
   prior to updating the fresh test table,
      receiving a request to indicate the freshness of the at least one changeable data, wherein receiving the request comprises:
         creating the new in-memory container, the new in-memory container comprising at least one key word and a corresponding identification representing the at least one changeable data containing the key word,
         associating the in-memory container with a list containing the at least one changeable data identification representing at least one changeable data,
         assigning the new in-memory index a unique container identification, and
         assigning a time stamp to the new in-memory container;
      creating a new container stored in the persistent storage medium ("persistent container") by merging all in-memory containers associate with one or more same items of changeable data;
      associating the new persistent container with a list identifying all items of changeable data associated with the new persistent container, wherein the list associated with the new persistent container further includes a Birthday value recorded in a header of a widset associated with the new persistent container;
      incrementing the Birthday value in the list associated with the new persistent container when the new persistent container appears in the list; and
      marking as invalid older versions of the items of changeable data in the lists associated with older persistent containers, prior to marking as invalid older versions of the items of changeable data,
         initiating an invalidation process comprising:
            pairing up the new persistent containers with the older persistent containers;
            iterating sequentially through the changeable data identifications associated with the new persistent containers,
            determining whether the older persistent container contains the changeable data identification,
            in response to determining that the older persistent container contains the changeable data identification, marking as invalid the older versions of the items of changeable data, and
            in response to determining that the older persistent contained does not contain the changeable data identification, determining whether there is another changeable data identification that has to be processed.

11. In a computer system including a volatile memory and a persistent storage medium, a computer-readable medium containing computer-executable instructions for performing a method for indicating the freshness of changeable data associated with a container, the method comprising:
   updating a fresh test table stored in the volatile memory with entries identifying each item of changeable data associated with a new container in the volatile memory each time a new in-memory container is created, the fresh test table comprising at least one changeable data identification, at least one index identification, and at least one time stamp;
   prior to updating the fresh test table,
      receiving a request to indicate the freshness of the at least one changeable data, wherein receiving the request comprises:
         creating the new in-memory container, the new in-memory container comprising at least one key word and a corresponding identification representing the at least one changeable data containing the key word,
         associating the in-memory container with a list containing the at least one changeable data identification representing at least one changeable data,
         assigning the new in-memory index a unique container identification, and
      assigning a time stamp to the new in-memory container;
   creating a new container stored in the persistent storage medium ("persistent container") by merging all in-memory containers associated with one or more same items of changeable data;
   associating the new persistent container with a list identifying all items of changeable data associated with the new persistent container, wherein the list associated with the new persistent container further includes a Birthday value recorded in a header of a widset associated with the new persistent container;
   incrementing the Birthday value in the list associated with the new persistent container when the new persistent container appears in the list; and
   marking as invalid older versions of the items of changeable data in the lists associated with older persistent containers, prior to marking as invalid older versions of the items of changeable data,
      initiating an invalidation process comprising: pairing up the new persistent containers with the older persistent containers, iterating sequentially through the changeable data identifications associated with the new persistent containers, determining whether the older persistent container contains the changeable data identification,
      in response to determining that the older persistent contained does not contain the changeable data identification, determining whether there is another changeable data identification that has to be processed.

12. The computer-readable medium of claim 11, wherein the in-memory fresh test table is a hash table.

13. The computer-readable medium of claim 11, wherein creating a new container stored in the persistent container by merging all in-memory containers associated with the at least one same items of changeable data further comprises:
   correlating the in-memory containers associated with the at least one same item of changeable data comprising entering, in a dependency table stored in the volatile memory, entries identifying the new in-memory container and any older in-memory container associated with the at least one same items of changeable data; and deleting the in-memory containers, and their entries in the in-memory fresh test table and the dependency table after the merge.

14. The computer-readable medium of claim 13, wherein the new in-memory container is associated with the list identifying all the items of changeable data associated with the new in-memory container, further comprising removing lists associated with the in-memory containers after the merge.

15. The computer-readable medium of claim 11, wherein the list associated with the new persistent container further comprises a data item called dirty bit, further comprising:

setting the dirty bit before the list goes through the invalidation process; and resetting the dirty bit when all older versions of the changeable data associated with the new persistent container are marked invalid in the lists associated with all the older persistent containers.

16. A computer-readable medium containing computer-executable instructions for performing a method of determining if a container of a plurality of containers that is associated with a particular item of changeable data is associated with the freshest version of the item of changeable data, each of the plurality of containers capable of being associated with one different version of the item of changeable data, the method comprising:

taking a snapshot of existing containers, wherein the snapshot has a snapshot time stamp;

determining whether the snapshot is marked as no freshness test necessary;

in response to determining that the snapshot is marked as no freshness test necessary, marking the snapshot as no freshness test necessary if all the existing containers are associated with newly created changeable data, wherein marking the snapshot comprising indexes that have at least one of the following: no dependencies and has been invalidated; and in response to determining that the snapshot is not marked as no freshness test necessary, determining the freshness of the item of changeable data associated with the container, wherein determining the freshness of the item of changeable data associated with the container comprises:

determining whether the container is an in-memory, in response to determining that the container is an in-memory container, determining that the container is associated with a freshest version, having a time stamp, of the item of changeable data if the snapshot time stamp has a value less than the snapshot time stamp, and in response to determining that the container is not an in-memory container, determining whether the snapshot is a query snapshot, the query snapshot comprising taking present containers and preventing the containers from being deleted.

17. The computer-readable medium of claim 16, wherein determining the freshness of the item of changeable data associated with the container comprises deciding that the container is associated with the freshest version of the item of changeable data if the snapshot is marked as no freshness test necessary.

18. The computer-readable medium of claim 16, wherein the snapshot includes in-memory containers and persistent containers and wherein determining the freshness of the item of changeable data associated with the container comprises deciding that the container, if it is an in-memory container, is associated with the freshest version of the item of changeable data when no newer in-memory container is associated with the item of changeable data.

19. The computer-readable medium of claim 16, wherein the snapshot includes in-memory containers and persistent containers and wherein determining the freshness of the item of changeable data associated with the container comprises deciding that the container is associated with the freshest version of the item of changeable data if:

the container is a persistent container;

no in-memory container is associated with the item of changeable data; and a list associated with the persistent container identifies the item of changeable data as valid.

* * * * *

UNITED STATES PATENT AND TRADEMARK OFFICE
CERTIFICATE OF CORRECTION

| | | |
|---|---|---|
| PATENT NO. | : 7,627,724 B2 | Page 1 of 1 |
| APPLICATION NO. | : 10/872744 | |
| DATED | : December 1, 2009 | |
| INVENTOR(S) | : Mihai Popescu-Stanesti et al. | |

It is certified that error appears in the above-identified patent and that said Letters Patent is hereby corrected as shown below:

In column 13, line 50, in Claim 3, delete "a" and insert -- the --, therefor.

In column 13, line 51, in Claim 3, after "all" insert -- the --.

In column 13, line 59, in Claim 3, delete "items" and insert -- item --, therefor.

In column 15, line 9, in Claim 10, before "a" delete "(a)".

In column 15, line 10, in Claim 10, before "a" delete "(b)".

In column 15, line 11, in Claim 10, before "a" delete "(c)".

In column 15, line 13, in Claim 10, before "updating" delete "(1)".

In column 15, line 39, in Claim 10, delete "associate" and insert -- associated --, therefor.

In column 15, line 56, in Claim 10, delete "containers;" and insert -- containers, --, therefor.

In column 16, line 55, in Claim 11, below "identification," insert -- in response to determining that the older persistent container contains the changeable data identification, marking as invalid the older versions of the items of changeable data, and --.

In column 16, line 62, in Claim 13, delete "a" and insert -- the --, therefor.

In column 16, line 63, in Claim 13, after "all" insert -- the --.

In column 16, line 64, in Claim 13, delete "items" and insert -- item --, therefor.

In column 17, line 3, in Claim 13, delete "items" and insert -- item --, therefor.

Signed and Sealed this
Eighteenth Day of January, 2011

David J. Kappos
*Director of the United States Patent and Trademark Office*